United States Patent
Nishi et al.

(10) Patent No.: US 7,852,734 B2
(45) Date of Patent: *Dec. 14, 2010

(54) RECORDING AND PLAYBACK APPARATUS AND OPTICAL HEAD

(75) Inventors: Noriaki Nishi, Tokyo (JP); Hiroaki Mizuma, Tokyo (JP); Motoi Kimura, Kanagawa (JP); Kenji Yamamoto, Kanagawa (JP); Masatoshi Nishino, Tokyo (JP)

(73) Assignee: Sony Corporation, Tokyo (JP)

( * ) Notice: Subject to any disclaimer, the term of this patent is extended or adjusted under 35 U.S.C. 154(b) by 112 days.

This patent is subject to a terminal disclaimer.

(21) Appl. No.: 11/751,062

(22) Filed: May 21, 2007

(65) Prior Publication Data

US 2007/0280083 A1 Dec. 6, 2007

Related U.S. Application Data

(60) Continuation of application No. 11/387,832, filed on Mar. 24, 2006, now Pat. No. 7,230,903, which is a division of application No. 10/295,203, filed on Nov. 15, 2002, now abandoned.

(30) Foreign Application Priority Data

Nov. 19, 2001 (JP) .............................. 2001-353382

(51) Int. Cl.
 *G11B 7/135* (2006.01)
(52) U.S. Cl. .............................. 369/112.02; 369/112.01
(58) Field of Classification Search ............. 369/112.02
 See application file for complete search history.

(56) References Cited

U.S. PATENT DOCUMENTS

| 5,450,376 | A | 9/1995 | Matsumura et al. | |
|---|---|---|---|---|
| 5,493,554 | A | 2/1996 | Sasaki et al. | |
| 6,031,809 | A | 2/2000 | Ohba | |
| 6,314,071 | B1 | 11/2001 | Alon et al. | |
| 6,628,599 | B2 * | 9/2003 | Maeda et al. | 369/112.01 |
| 6,940,794 | B2 | 9/2005 | Hayashi | |
| 2002/0141321 | A1 | 10/2002 | Wada et al. | |
| 2003/0179671 | A1 | 9/2003 | Nishi et al. | |
| 2004/0017758 | A1 * | 1/2004 | Maeda et al. | 369/112.02 |
| 2005/0117494 | A1 | 6/2005 | Nishi et al. | |

FOREIGN PATENT DOCUMENTS

| JP | 60-237648 | 11/1985 |
|---|---|---|
| JP | 04-255925 | 10/1992 |
| JP | 2000-36152 | 2/2000 |
| JP | 2000-195086 | 7/2000 |

OTHER PUBLICATIONS

JP 2000-036152 English translation.*

* cited by examiner

*Primary Examiner*—Van N Chow
(74) *Attorney, Agent, or Firm*—Oblon, Spivak, McClelland, Maier & Neustadt, L.L.P.

(57) ABSTRACT

The light intensity of a light beam emitted from a light source is appropriately controlled when the light beam is transmitted through a variable optical coupling efficiency device in an optical head. During a read mode, the light beam from the light source is incident on an optical disk at an intensity relatively weaker than that of the light source. By switching the optical coupling efficiency of the variable optical coupling efficiency device between a write mode and a read mode, the light intensity directed to an optical recording medium is substantially varied from the write mode to the read mode. This arrangement eliminates the need for substantially increasing the optical output power ratio of the light source of write power to read power.

10 Claims, 11 Drawing Sheets

A (REPRESENTS RUBBING DIRECTION)

RECORDING AND PLAYBACK APPARATUS AND OPTICAL HEAD

CROSS REFERENCE

This application is a continuation of and is based upon and claims the benefit of priority under 35 U.S.C. §120 for U.S. Ser. No. 11/387,832, filed Mar. 24, 2006, which is a division of U.S. Ser. No. 10/298,203, filed Nov. 15, 2002, and claims the benefit of priority under 35 U.S.C. §119 from Japanese Patent Application No. 2001-353382, filed Nov. 19, 2001, the entire contents of each which are incorporated herein by reference.

BACKGROUND OF THE INVENTION

1. Field of the Invention

The present invention relates to a recording and playback apparatus for recording and playing back a variety of pieces of information to and from an optical recording medium, and an optical head for use in an optical apparatus such as the recording and playback apparatus, and a variable optical coupling efficiency device for use in the optical head.

2. Description of the Related Art

Optical recording media such as an optical disk have ruggedness (pits) representing signal information. Some recording media are used as playback purposes only. Some permit recording and playback operations using phase variation along a groove structure or using magneto-optical recording.

The optical head of a recording and playback apparatus such as an optical disk device which employs a write and read optical disk typically uses a semiconductor laser. The semiconductor laser light source typically gives a relatively high maximum optical output power to satisfy the following requirements.

(1) The semiconductor laser has difficulty in outputting a stable oscillation in a low output power level thereof, and laser noise becomes large in magnitude. To assure a required CNR (Carrier to Noise Ratio) during playback time, the output power of the laser must be set to be higher than a predetermined level. An laser output power of 2 to 5 mW is typically required.

(2) A writable optical recording medium performs a recording operation taking advantage of a rise in temperature of a recording layer due to an optical spot on the medium in which a light beam is focused. The recording power must be set to within a range that prevents the recording layer from being damaged by laser power during a playback operation while performing stable recording during a recording operation.

To satisfy these requirements, a difference in power must be permitted between during the playback operation and during the recording operation. A ratio of the maximum recording power/maximum playback power typically falls within a range of 5 to 20.

To perform recording at a speed higher than standard speed, a larger output power ratio is needed.

The maximum power rating of a light source of a write and read optical head is usually 20 to 50 mW to satisfy the above two requirements. A CD-R/RW that operates eight times as high as the standard speed has an output power of 100 mW.

A light source having a large optical output power is not only impracticable but also consumes much power.

If the maximum optical power rating is set to be low, no satisfactory playback characteristics are obtained because of a high noise level during the replay time.

SUMMARY OF THE INVENTION

Accordingly, it is an object of the present invention to provide an optical head, a recording and playback apparatus, and a variable optical coupling efficiency device in which a low laser noise level is achieved during a playback mode even if an output power ratio of write to read power in a light source is small, and excellent recording and playback characteristics are achieved even if a light source easy to manufacture or having a low optical output power rating is used.

An optical head of the present invention in one aspect includes a light source which emits a light beam, a light condenser which feeds the light beam from the light source to an optical recording medium, a light splitter which splits light into the light beam emitted from the light source and the light beam reflected from the optical recording medium, a light detector which detects the light beam reflected from the optical recording medium and split by the light splitter, and a variable optical coupling efficiency device which is disposed between the light source and the light splitter and varies the optical coupling efficiency thereof, which is a ratio of the amount of light condensed on the optical recording medium to the total amount of light of the light beam emitted from the light source.

A recording and playback apparatus of the present invention in another aspect includes a rotary drive which supports and rotates an optical recording medium, an optical head which directs a light beam to the optical recording medium rotated by the rotary driver through light condenser and detects light reflected from the optical recording medium through the light condenser using a light detector, and an actuator for moving the optical head. The optical head includes a light source which emits the light beam, the light condenser which feeds the light beam from the light source to the optical recording medium, a light splitter which splits light into the light beam emitted from the light source and the light beam reflected from the optical recording medium, the light detector which detects the light beam reflected from the optical recording medium and split by the light splitter, and a variable optical coupling efficiency device which is disposed between the light source and the light splitter and varies the optical coupling efficiency thereof, which is a ratio of the amount of light condensed on the optical recording medium to the total amount of light of the light beam emitted from the light source.

In the apparatus of the present invention that records and plays back a signal to and from the optical recording medium, the variable optical coupling efficiency device is disposed between the optical recording medium and the light source, and varies the optical coupling efficiency thereof, which is the ratio of the amount of light condensed on the optical recording medium to the total amount of light of the light beam emitted from the light source.

In the optical head of the present invention, the variable optical coupling efficiency device is disposed between the light source and the light splitter and varies the optical coupling efficiency thereof, which is the ratio of the amount of light condensed on the optical recording medium to the total amount of light of the light beam emitted from the light source.

By switching the optical coupling efficiency of the variable optical coupling efficiency device between a write mode and a read mode, the light intensity directed to an optical recording medium is thus substantially varied from the write mode to the read mode. This arrangement eliminates the need for substantially increasing the optical output power ratio of write power to read power on the light source.

Even if a light source easy to manufacture or having a low optical output power rating is used, an optical beam at an appropriate intensity level is directed to the optical recording medium for recording or playback during a write mode or a read mode, and excellent recording and playback characteristics are achieved.

DESCRIPTION OF THE PREFERRED EMBODIMENTS

The embodiments of an optical head, recording and playback apparatus, and variable optical coupling efficiency device of the present invention will now be discussed below with reference to the accompanying drawings.

Since the following embodiments are only preferred examples of the present invention, the embodiments are subject to technical limitations. The present invention is not limited to these embodiments unless otherwise particularly noted.

Figure 1:
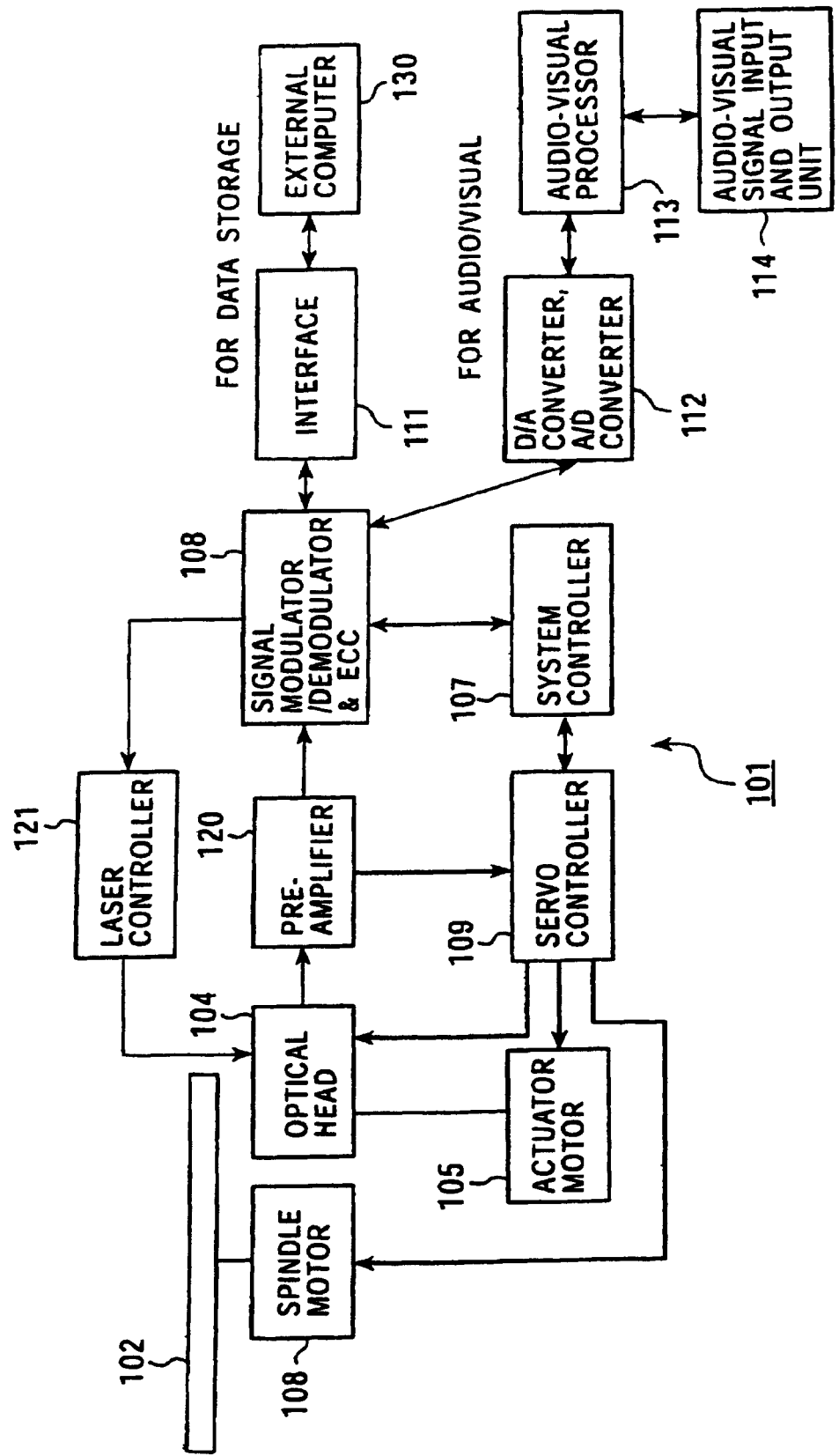
FIG. 1 is a block diagram illustrating the construction of an optical disk recording and playback apparatus incorporating an variable optical coupling efficiency device and an optical head in accordance with a first embodiment of the present invention.

FIG. 1 is a block diagram of an optical disk recording and playback apparatus 101 incorporating a variable optical coupling efficiency device 3 and an optical head 104 in accordance with a first embodiment of the present invention. The optical disk recording and playback apparatus 101 shown in FIG. 1 is one example of the recording and playback apparatus that incorporates the variable optical coupling efficiency device 3 and the optical disk 104 to be discussed below.

As shown, the recording and playback apparatus 101 includes a spindle motor 103 working as a rotary drive for rotating an optical disk 102, an optical head 104, and an actuator motor 105 working as an actuator of the optical head 104.

The spindle motor 103 is controlled by a system controller 107 and a servo controller 109, and is thus rotated at a predetermined rpm.

The optical disk 102 may be a recording and playback disk using an optically modulated record signal, such as a "CD-R/RW" disk, "DVD-RAM" disk, "DVD-R/RW" disk, "DVD+RW" disk, electro-magnetic recording medium such as "GIGAMO", "iD", or a high-density optical disk such as "DVR-BLUE" having a wavelength of approximately 405 nm and currently under development. The optical disk 102 may be a read-only pit disk.

A modulator/demodulator and ECC (Error Correction Code) block 108 modulates or demodulates a signal and adds an ECC to the signal. The optical head 104 directs a light beam on a signal recording surface of the rotating optical disk 102 in response to a command from the modulator/demodulator and ECC block 108. The light beam writes information to or read information from the optical disk 102.

The optical head 104 detects various beams in a light flux reflected from the signal recording surface of the optical disk 102, and supplies a preamplifier 120 with a signals corresponding to the light beams.

The preamplifier 120 generates a focus error signal, a tracking error signal, and an RF signal in response to the signals corresponding to the light beams. Depending on the type of a recording medium to be played back, the servo controller 109 and the modulator/demodulator and ECC block 108 perform respective processes including demodulation and error correction based on these signals.

The demodulated record signal is sent to an external computer 130 through an interface 111 if the record signal is intended for storage in the computer. The external computer 130 receives the record signal stored in the optical disk 102 as a playback signal.

For audio-visual applications, the record signal is digital-to-analog converted by a D/A converter portion of a D/A and A/D converter block 112 and is then fed to an audio-visual processor 113. The analog signal is then processed by the audio-visual processor 113 and is then sent to an external imaging and video apparatuses through an audio-visual signal input/output unit 114.

The actuator motor 105 is connected to the optical head 104. The actuator motor 105 moves the optical head 104 to a desired recording track on the optical disk 102. The servo controller 109 controls the spindle motor 103, the actuator motor 105, and a two-axis actuator holding and moving an objective lens of the optical head 104 in a focusing direction and a tracking direction.

The servo controller 109 controls the variable optical coupling efficiency device 3 in the optical head 104 of the present invention, thereby varying the optical coupling efficiency of the optical head 104 between during a write (recording) mode and during a read (playback) mode. The optical coupling efficiency refers to a ratio of the amount of light condensed on the optical disk 102 to the total amount of light of the light beam emitted from the laser light source.

The laser controller 121 controls a laser light source 2 in the optical head 104. In this embodiment, the laser controller 121 controls the output power of the laser light source 2 during the write mode and the read mode.

Figure 2:
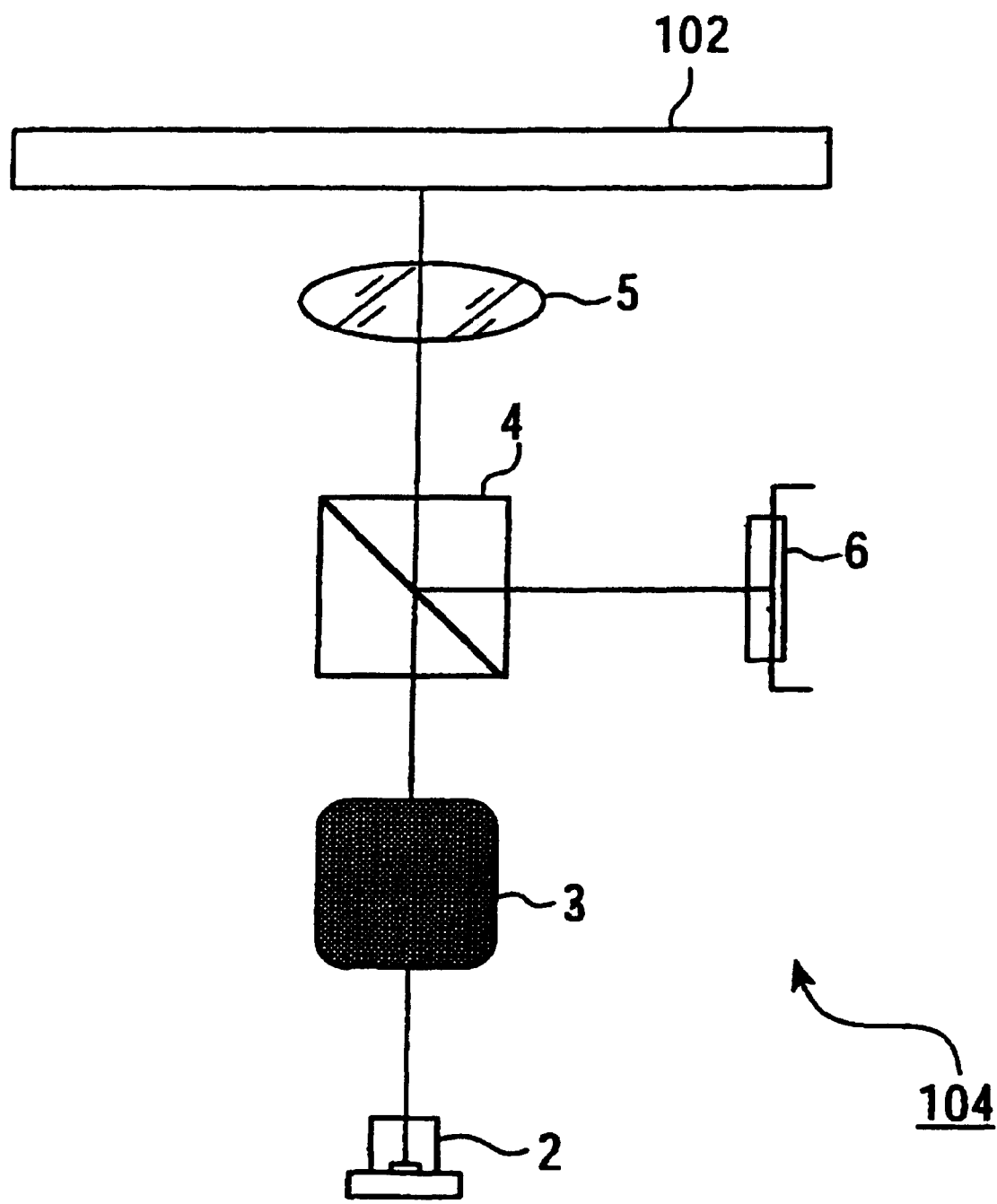
FIG. 2 illustrates an optical system of the optical head in the recording and playback apparatus of FIG. 1.

FIG. 2 illustrates the optical system of the optical head 104 in the first embodiment of the present invention.

As shown, the optical head 104 includes the light source 2, variable optical coupling efficiency device (variable optical coupling efficiency means) 3, beam splitter (beam splitter means) 4, objective lens (light condenser means) 5, and photosensor (light detector means) 6. These optical components are assembled together.

In the optical head 104, a light beam emitted from the light source 2 is incident on the variable optical coupling efficiency device 3, and the light beam transmitted through the variable optical coupling efficiency device 3 enters the beam splitter 4.

The light beam transmitted through the beam splitter 4 is condensed on a signal recording layer of the optical disk 102 through the objective lens 5.

The light flux reflected from the recording layer of the optical disk 102 is split from the light beam emitted from the light source 2 and is then input to the photosensor 6. The RF signal, focus error signal, and tracking error signal are picked up from the signal received by the photosensor 6.

The variable optical coupling efficiency device 3 in the optical head 104 appropriately varies the intensity of the light beam when the light beam emitted from the light source 2 is transmitted through the variable optical coupling efficiency device 3. During a read mode, the light beam is incident on the optical disk 102 at an intensity weaker than the intensity of the light beam at the light source 2.

Let CEW (Coupling Efficiency-Write) represent the optical coupling efficiency of the light beam which is emitted from the light source 2 and is incident on the optical disk 102 during the write mode, and let CER (Coupling Efficiency-Read) represent the coupling efficiency of the light beam which is emitted from the light source 2 and is incident on the optical disk 102 during the read mode, and the following relationship holds:

$$CEW > CER$$

By switching the optical coupling efficiency of the variable optical coupling efficiency device 3 from the write mode to the read mode, the light intensity level at the optical recording medium is substantially varied from the write mode to the read mode. This arrangement eliminates the need for greatly varying the output power of the light source 2 between the write mode and the read mode. Recording and playback operations are thus carried out by irradiating the signal recording layer of the optical disk 102 with the light beam at an appropriate level during each of the write mode and the read mode. Optimum recording and playback characteristics are thus obtained.

The operation of the variable optical coupling efficiency device 3 of the first embodiment will now be discussed in detail.

Let CE0 represent the optical coupling efficiency of the optical disk 102 without using the variable optical coupling efficiency device 3, TW represent the transmission ratio of the variable optical coupling efficiency device 3 to the transmitted light during the write mode, and TR represent the transmission ratio of the variable optical coupling efficiency device 3 to the transmitted light during the read mode, and the following equations hold:

Optical coupling efficiency during the write mode $CEW = CE0 \times TW$

Optical coupling efficiency during the read mode $CER = CE0 = TR$

Let PW represent the required amount of light on the signal recording surface during the write mode, PR represent the required amount of light on the signal recording surface during the read mode, and the required outputs LDW (for recording) and LDR (for playback) of the light source 2 are expressed as follows:

Output power for recording $LDW = PW/CEW = PW/(CE0 \times TW)$

Output power for playback $LDR = PR/CER = PR/(CE0 \times TR)$

The required dynamic range LDW/LDR of the output power of the light source 2 is $$LDW/LDR = (PW/PR) \times (TR/TW)$$

(TR=TW if no variable optical coupling efficiency device 3 is used.)

The required dynamic range of the light source 2 is varied within a range of the coupling ratio of the variable optical coupling efficiency device 3 to the transmitted light.

The operation of the variable optical coupling efficiency device 3 is discussed below using specific numeric values.

A semiconductor laser is used as the light source. It is assumed that the optical output power resulting in a stable laser oscillation with low laser noise is 4 mW, and that the maximum optical output power is 30 mW.

It is also assumed that the required optical power PW and PR at the signal recording surface for the optical disk 102 are 10 mW (PW) and 1 mW (PR).

The dynamic ranges of the optical output power in the first embodiment but without the variable optical coupling efficiency device 3 are as follows:

The dynamic range of the optical output power of the light source 2=30 mW/4 mW=7.5

The required dynamic range of the optical output power $$= LDW/LDR = PW/PR = 10 \text{ mW}/1 \text{ mW} = 10$$

This light source fails to result in satisfactory recording and playback characteristics.

The dynamic ranges of the optical output power in the first embodiment with the variable optical coupling efficiency device 3 employed are as below.

It is assumed that the transmission ratios of the variable optical coupling efficiency device 3 to the transmitted light are TW=100% and TR=50%.

The required dynamic range of the optical output power $$= LDW/LDR = (PW/PR) \times (TR/TW) = (10 \text{ mW}/1 \text{ mW}) \times (50\%/100\%)$$

$$= 5$$

The required dynamic range is below the dynamic range of the light source 2, and this setting is achievable.

By setting CE0=40% in the optical system in design, optical coupling efficiency during the write mode $$CEW = CE0 \times TW = 40\%$$

and, optical coupling efficiency during the read mode $$CER = CE0 \times TR = 20\%$$

The required optical output power of the light source 2 during the signal recording mode LDW is $$LDW = PW/CEW = 10 \text{ mW}/40\% = 25 \text{ mW}$$

The required optical output power of the light source 2 during the signal playback mode LDR is LDR=PR/CER=1 mW/20%=5 mW With the optical output power of 25 mW below the maximum optical output power of 30 mW with a sufficient margin, the recording operation is performed. The optical output power of 5 mW, sufficiently higher than the optical output power of 4 mW that results in sufficiently low laser noise, permits a excellent playback operation.

The manufacturing of the light source 2 is thus easy. Without the need for a special light source, an optical head and a recording and playback apparatus with satisfactory characteristics are obtained.

The arrangements of the variable optical coupling efficiency device 3 are discussed below.

First Arrangement

A first arrangement of the variable optical coupling efficiency device 3 in accordance with the first embodiment uses means that varies the transmittance ratio or the reflectance ratio to the light beam. The optical coupling efficiency is varied when the means varies the transmittance ratio or the reflectance ratio thereof to the light beam.

Second Arrangement

A second arrangement of the variable optical coupling efficiency device 3 in accordance with the first embodiment uses optical path branching means that branches the light beam into at least two optical paths. The optical coupling efficiency is varied when the optical path branching means branches the light beam into at least two optical paths.

The arrangements are discussed.

Figure 3A:
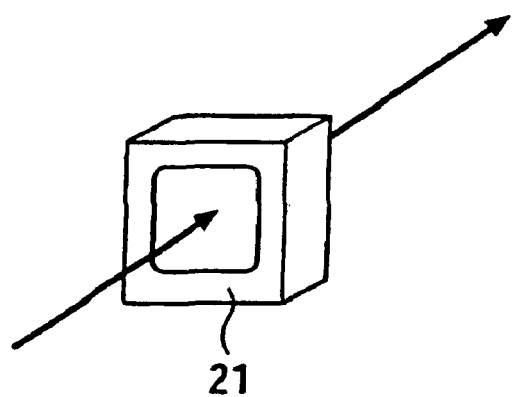
FIGS. 3A and 3B illustrate a first arrangement of the variable optical coupling efficiency device in the optical head of FIG. 2.
Figure 3B:
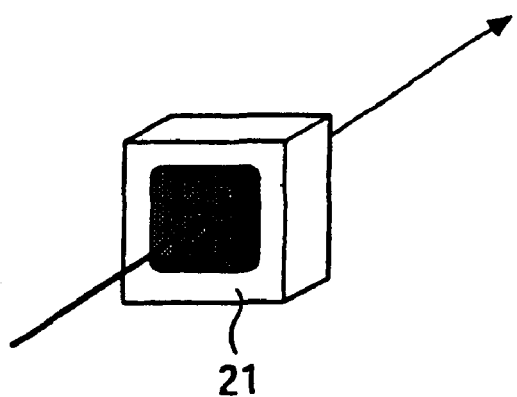

FIG. 3 illustrates the first arrangement. A transmissive-type liquid-crystal device 21 is used as used as the means for varying the transmittance ratio to the light beam.

The liquid-crystal device 21 varies the transmittance ratio thereof to the light beam by changing an applied voltage. The applied voltage, when being varied, drives the liquid crystal of the liquid-crystal device 21, thereby controlling the transmittance ratio thereof. The liquid-crystal device 21 is controlled by a liquid-crystal driver circuit arranged in the servo controller 109.

FIG. 4 illustrates a first modification of the first arrangement. A filter plate 22 is used as the means for varying the transmittance ratio to the light beam.

The filter plate 22 has a translucent filter 22B on a portion of a slidably movable transparent plate 22A.

The filter 22B is moved in position in the optical path of the laser light beam, thereby varying the transmittance ratio.

Figure 4A:
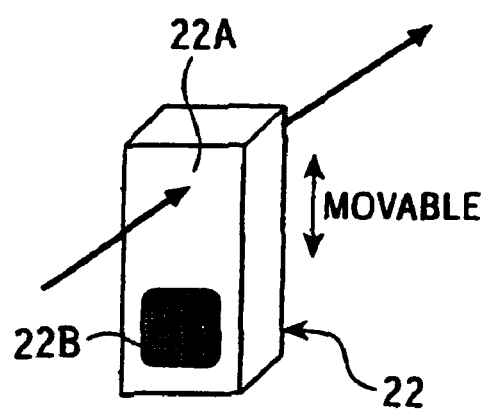
FIGS. 4A and 4B illustrates a first modification of the first arrangement of the variable optical coupling efficiency device in the optical head of FIG. 2.
Figure 4B:
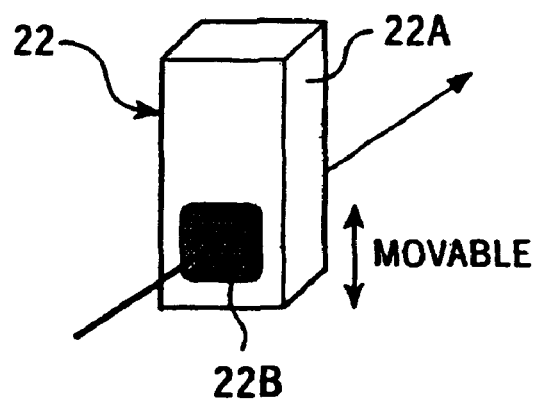

Referring to FIG. 4B, the filter 22B, arranged in the optical path of the laser light beam, reduces the amount of light transmitted therethrough, thereby lowering the optical coupling efficiency. Referring to FIG. 4A, a portion of the transparent plate 22A other than the filter 22B is arranged in the optical path of the laser light beam so that the whole laser light beam is transmitted therethrough. The amount of light transmitted is increased, and the optical coupling efficiency rises.

The filter plate 22 may be supported by a piezoelectric element, which is controlled by a driver circuit arranged in the servo controller 109. The position of the filter plate 22 is thus controlled. Alternatively, the filter plate 22 may be supported by a mechanism including a feed screw and a motor. The position of the filter plate 22 is thus controlled by causing a driver circuit arranged in the servo controller 109 to control the motor.

The first arrangement is of a transmissive type. Alternatively, a reflective element may be arranged in the optical path of the laser light beam. The reflectance ratio thereof may be modified.

Figure 5A:
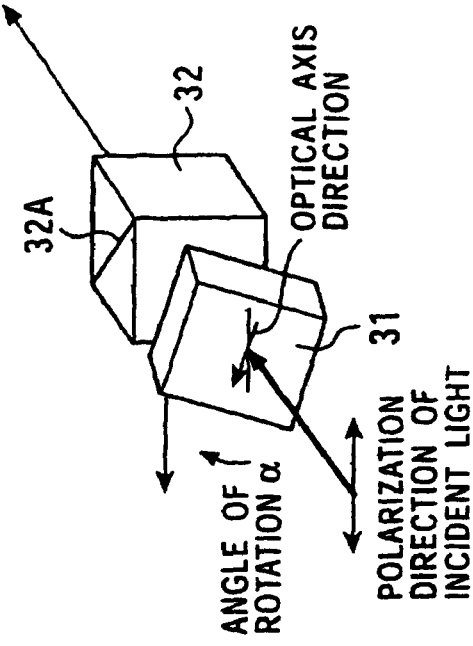
FIGS. 5A, 5B and 5C illustrate a second arrangement of the variable optical coupling efficiency device of in the optical head FIG. 2.
Figure 5B:
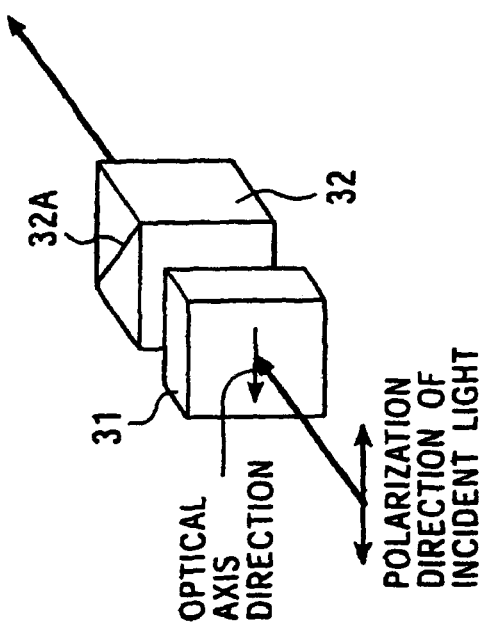

FIGS. 5A and 5B illustrate the second arrangement. A wavelength plate 31 and a beam splitter 32 are arranged as the optical path branching means which branches the light beam. By rotating the wavelength plate 31 about the optical axis with a rotation unit(not shown), the beam splitter layer of the beam splitter 32 branches the light beam.

If the optical axis direction of the wavelength plate 31 is aligned with the polarization direction of the incident light as shown in FIG. 5A, the incident light beam is entirely transmitted through the beam splitter 32 to the optical disk 102 rather than being reflected from the beam splitter 32.

If the optical axis direction of the wavelength plate 31 is rotated by a constant angle of $\alpha$ from the polarization direction of the incident light as shown in FIG. 5B, a portion of the incident light is reflected from the beam splitter 32 while the rest of the incident light is transmitted toward the optical disk 102.

If the beam splitter layer is a full PS splitter layer (Tp=100% and Rs=100%), and if the wavelength plate is a half wave length plate, the relationship between the angle of rotation $\alpha$ and the ratio of transmitted light T becomes as discussed below.

Figure 5C:
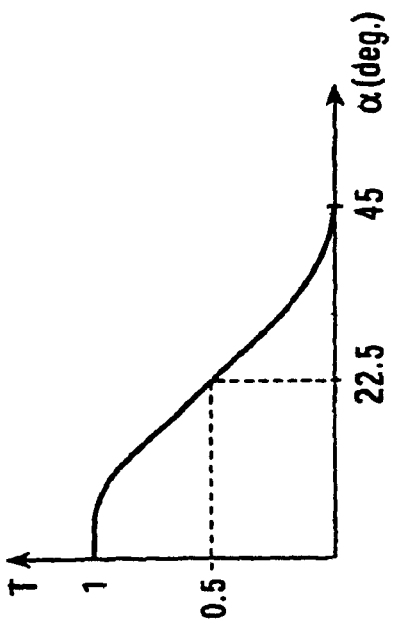

The angle of rotation $\alpha$ causes the polarization direction to rotate by $2\alpha$. The ratio of the P-polarized light incident on the beam splitter (the transmission ratio T of the transmitted light) is $T=\cos^2 2\alpha=(1+\cos 4\alpha)/2$ The ratio of the P-polarized light is plotted as in FIG. 5C.

If an optical coupling efficiency within a range of 50% to 100% is desired, $\alpha$=0 degree to 22.5 degrees. In this way, the polarization direction varies to 45 degrees. The ratio of transmitted light is thus controlled to 100% or 50%.

Figure 6A:
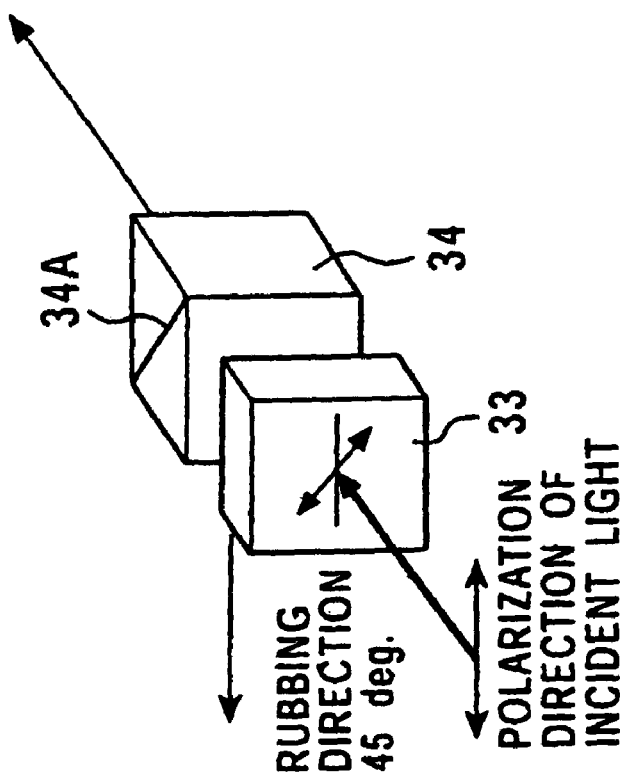
FIGS. 6A and 6B illustrate a first modification of the second arrangement of the variable optical coupling efficiency device in the optical head of FIG. 2.
Figure 6B:
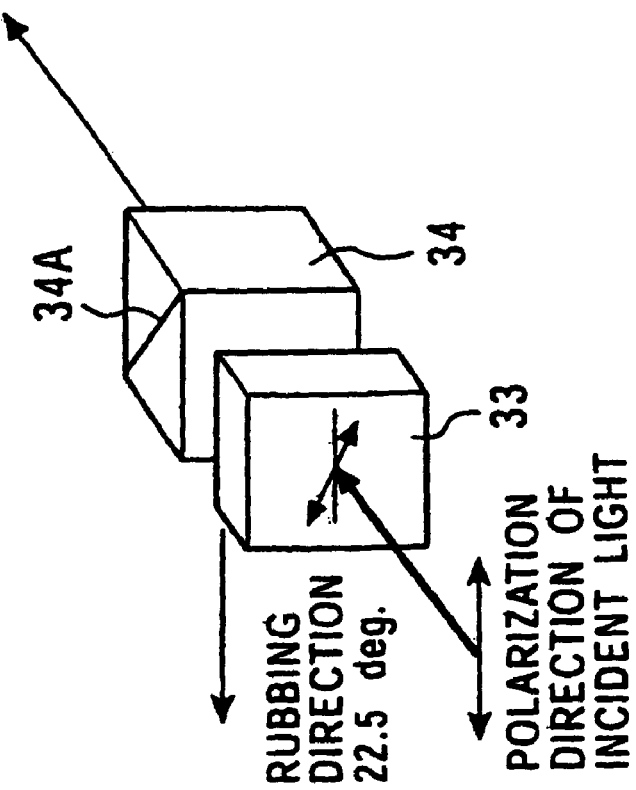

FIGS. 6A and 6B illustrate a first modification of the second arrangement. A liquid-crystal device 33 and a beam splitter 34 are arranged as the optical path branching means for branching the optical path. With the liquid-crystal device 33 working as a wavelength plate, a beam splitter layer 34A of the beam splitter 34 branches the light beam.

Referring to FIG. 6A, the liquid-crystal device 33 with the rubbing direction thereof set at 22.5 degrees is used. The polarization direction of the light beam incident on the beam splitter 34 is varied by 45 degrees by varying a phase difference of the liquid-crystal device 33 within a range of from $N\lambda$ to $(N+0.5)\lambda$ or a range of from $N\lambda$ to $(N-0.5)\lambda$. Here, N represents an integer, and $\lambda$ represents the wavelength of the light beam. The transmission ratio of the transmitted light is thus varied within a range of from 50% to 100%.

Referring to FIG. 6B, the liquid-crystal device 33 with the rubbing direction thereof set at 45 degrees is used. The light incident on the beam splitter 34 is changed from P-polarized light to circularly polarized light by varying the phase difference of the liquid-crystal device 33 within a range of from $N\lambda$ to $(N+0.25)\lambda$ or a range of from $N\lambda$ to $(N-0.25)\lambda$. Here, N represents an integer, and $\lambda$ represents the wavelength of the light beam. The transmission ratio of the transmitted light is thus varied within a range of from 50% to 100%.

The principle of generating the phase difference using the liquid-crystal device is briefly discussed below.

Figure 7A:
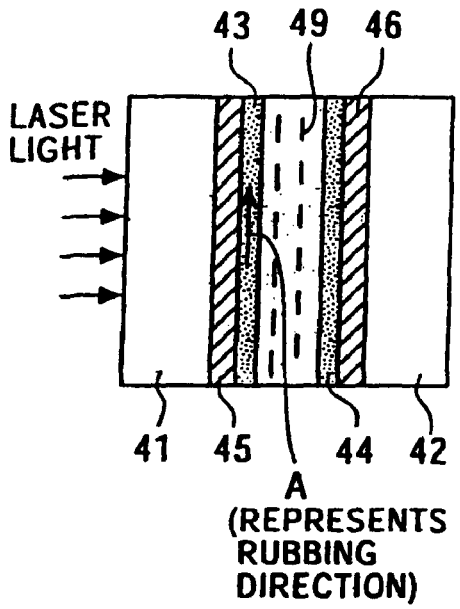
FIGS. 7A-7D illustrate the construction of a liquid-crystal device working as the variable optical coupling efficiency device shown in FIGS. 6A and 6B and the effect thereof.
Figure 7B:
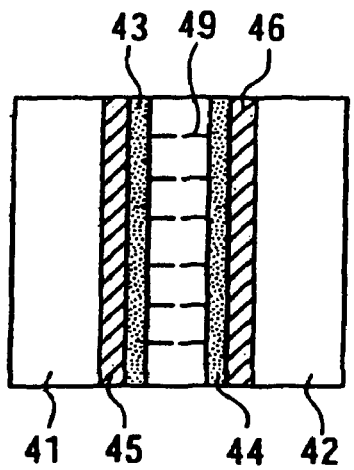
Figure 7C:
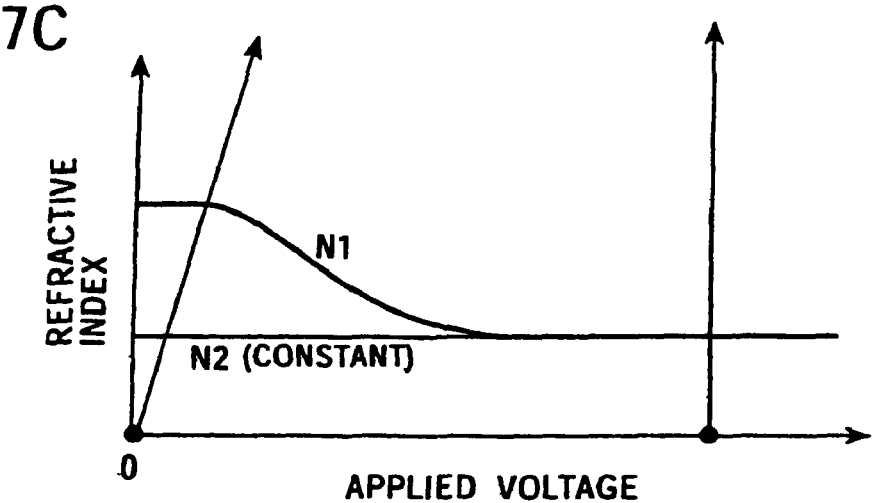
Figure 7D:
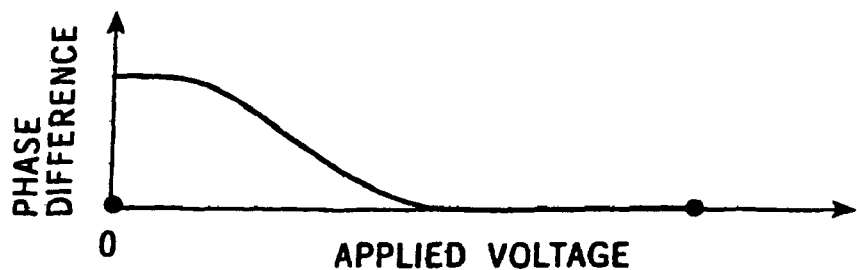

FIGS. 7A and 7B are sectional views of the liquid-crystal device. FIG. 7C is a plot of a change in refractive index of the liquid-crystal device versus a voltage applied to the liquid-crystal device. FIG. 7D is a plot of a change in phase difference versus the applied voltage in the liquid-crystal device.

Referring to FIGS. 7A and 7B, the liquid-crystal device 40 includes liquid-crystal molecules 49 between a pair of glass substrates 41 and 42. Alignment layers 43 and 44, arranged respectively on the inner surfaces of the glass substrates 41 and 42, align the liquid-crystal molecules 49.

Transparent electrodes 45 are interposed between the glass substrate 41 and the alignment layer 43, and transparent electrodes 46 are interposed between the glass substrate 42 and the alignment layer 44.

When a voltage is applied between the transparent electrodes 45 and the transparent electrodes 46, the liquid-crystal device 40 shifts from the state in which the liquid-crystal molecules 49 are aligned to be parallel with the alignment layers 43 and 44 and along the rubbing direction (as represented by an arrow A) as shown in FIG. 7A to the state in which the liquid-crystal molecules 49 are aligned to be perpendicular to the alignment layers 43 and 44 as shown in FIG. 7B.

Let N1 represent the refractive index of the liquid-crystal molecules 49 in a direction parallel with the alignment layers 43 and 44 and along the rubbing direction, and N2 represent the refractive index of the liquid-crystal molecules 49 in a direction perpendicular to the rubbing direction. In response to a shift of the liquid-crystal molecules 49 due to a change in the applied voltage, the refractive index N2 along the rubbing direction varies as plotted in FIG. 7C. The refractive index N2 in a direction perpendicular to the rubbing direction remains unchanged.

The phase difference caused in the incident light along the rubbing direction varies as plotted in FIG. 7D.

This principle allows the liquid-crystal device to be used as a wavelength plate. In combination with the beam splitter, the liquid-crystal device works as the optical path branching means.

The two settings illustrated in FIGS. 6A and 6B are for exemplary purposes only. The rubbing direction and the range of phase difference are subject to change depending on a desired range in the transmission ratio of the transmitted light.

Figure 8A:
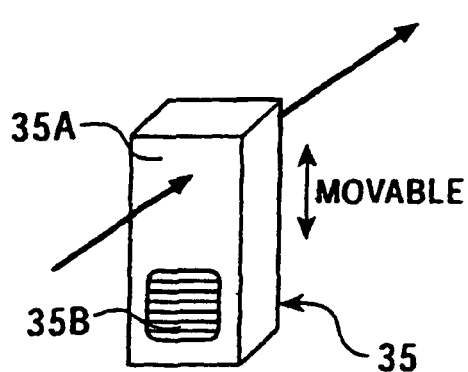
FIGS. 8A and 8B illustrate a second modification of the second arrangement of the variable optical coupling efficiency device in the optical head of FIG. 2.
Figure 8B:
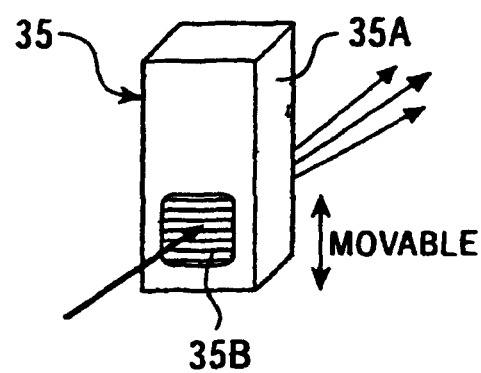

FIGS. 8A and 8B illustrate a second modification of the second arrangement. A diffraction grating plate 35 is used as the optical path branching means for branching the light beam.

The diffraction grating plate 35 has a diffraction grating 35B on a portion of a slidably movable transparent plate 35A.

The branching state of the laser light beam is changed by moving the diffraction grating 35B in position in the optical path of the laser light beam.

Referring to FIG. 8B, the laser light beam is branched by placing the diffraction grating 35B in the optical path of the laser light beam to lower the optical coupling efficiency.

Referring to FIG. 8A, the laser light beam is transmitted through the diffraction grating plate 35 rather than being branched by placing the a portion of the transparent plate 35A other than the diffraction grating 35B in the optical path of the laser light beam.

The diffraction grating plate 35 may be supported by a piezoelectric element, which is controlled by a driver circuit arranged in the servo controller 109. The position of the diffraction grating plate 35 is thus controlled. Alternatively, the diffraction grating plate 35 may be supported by a mechanism including a feed screw and a motor. The position of the diffraction grating plate 35 is thus controlled by causing a driver circuit arranged in the servo controller 109 to control the motor.

If the diffracted light ratio of the diffraction grating 35B is set to be first-order light: zero-order light: —first-order light=25%:50%:25% (for simplicity, higher order light equal to or higher than+/− second-order light components is not considered), the light beam used for signal recording and playback is varied within a range of from 100% to 50%.

Figure 9A:
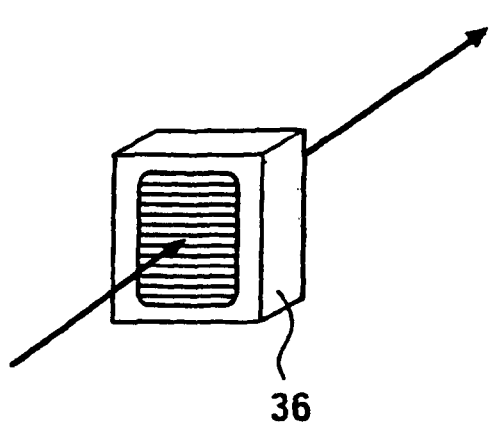
FIGS. 9A and 9B illustrate a third modification of the second arrangement of the variable optical coupling efficiency device in the optical head of FIG. 2.
Figure 9B:
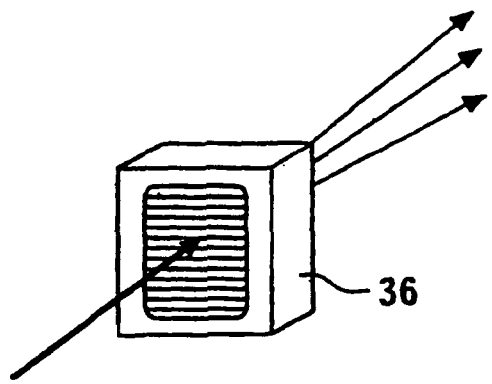

FIGS. 9A and 9B illustrate a third modification of the second arrangement. A liquid-crystal device 36 capable of varying the phase difference thereof in a diffraction grating configuration is used as the optical path branching means for branching the optical beam.

In the liquid-crystal device 36, a transparent electrode layer shown in FIG. 7 is divided into a plurality of segments. Different voltages are supplied to the segment electrodes. Alternatively, the glass substrate is partly inclined so that the liquid crystal is varied in thickness. In these constructions, the phase difference is varied in a grating configuration so that the diffraction grating having a variable phase depth is obtained.

The liquid-crystal device 36 changes the diffracted light ratio depending on the phase depth (a difference in the phase difference). For example, the following setting is possible.

For recording: first-order light: zero-order light: —first-order light=5%:90%:5%

For playback: first-order light: zero-order light: —first-order light=25%:50%:25%

The switching operation of the recording and playback apparatus 101 thus constructed between the write mode and the read mode is discussed below.

Figure 10:
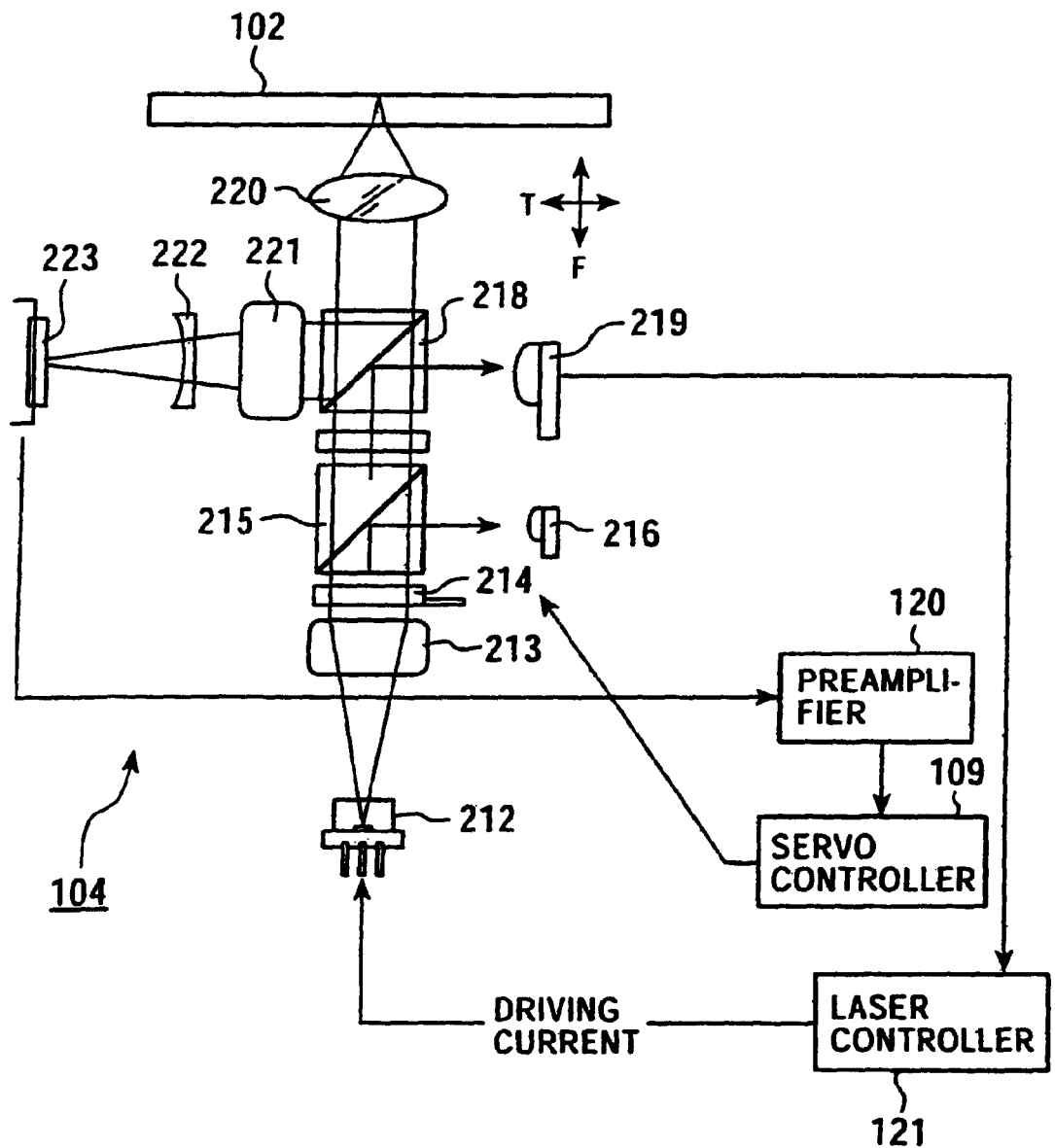
FIG. 10 is a block diagram illustrating a part of a recording and playback system of the recording and playback apparatus of FIG. 1.

FIG. 10 is a block diagram illustrating a part of the recording and playback system of the optical disk recording and playback apparatus 101.

Figure 11A:
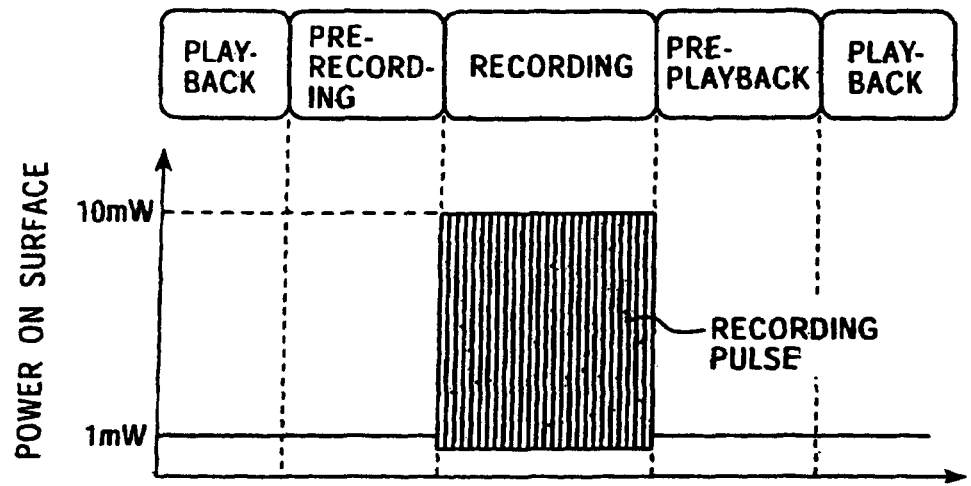
FIGS. 11A-11C are timing diagrams illustrating states of laser light in the recording and playback apparatus shown in FIG. 1 when the apparatus switches between a recording mode and a playback mode.
Figure 11B:
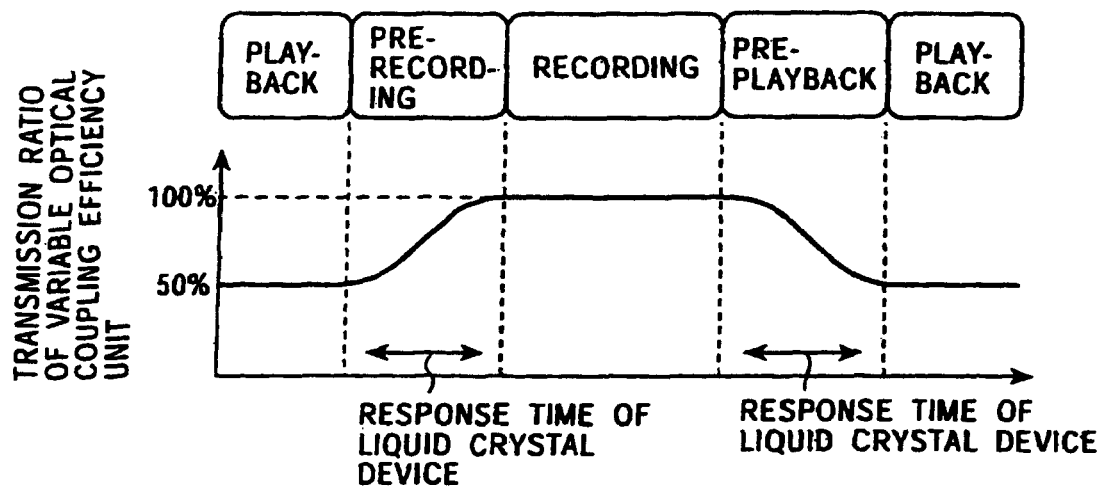
Figure 11C:
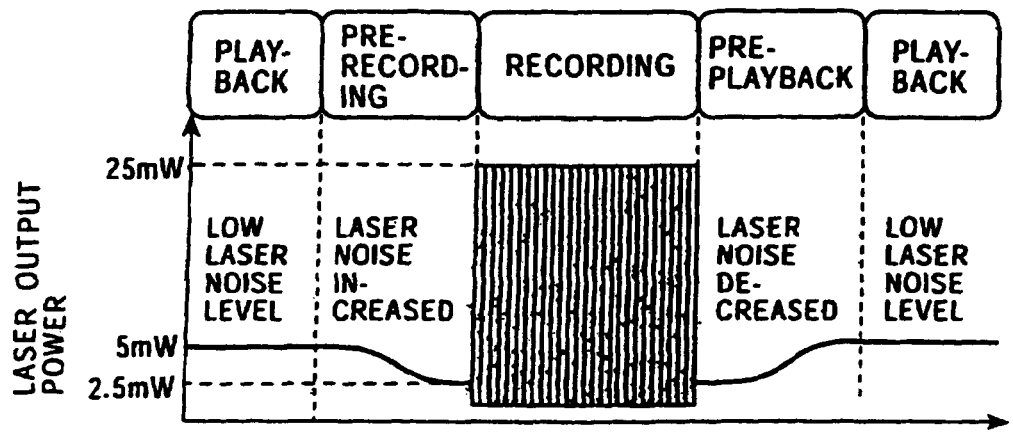

FIGS. 11A-11C are timing diagrams illustrating the states of the laser light beam when the optical disk recording and playback apparatus 101 is switched between the write mode and the read mode. FIG. 11A illustrates the amount of light (power at the surface of the disk) condensed on the signal recording surface of the optical disk 102. FIG. 11B illustrates a transmission ratio of the laser light beam at the variable optical coupling efficiency device 3. FIG. 11B illustrates a change in the laser output power of the optical disk 102.

Referring to FIG. 10, the optical head 104 includes a semiconductor laser device 212, collimator lens 213, wavelength-type liquid-crystal device 214, beam splitter 215, optical monitor 216, beam splitter 218, FAPC (Front Auto Power Control) detector device 219, objective lens 220, multi-lens 221, multi-lens 222, and optical detector 223. These individual components are assembled to form the optical head 104.

A current for driving a semiconductor laser chip (not shown) in the semiconductor laser device 212 is supplied from the laser controller 121 external to the optical head 104. The applied voltage to the audio-visual signal input/output unit 114 is controlled by the servo controller 109.

The optical path of the optical head 104 is now briefly discussed.

In the optical head 104, a light beam emitted from the semiconductor laser device 212 is guided to the collimator lens 213 to be converted into a collimated light beam, which is then incident on the wavelength-type liquid-crystal device 214.

The wavelength-type liquid-crystal device 214 changes the phase difference thereof in response to the voltage applied thereto. The light beam transmitted through the wavelength-type liquid-crystal device 214 with the polarization state changed in accordance with the phase difference enters the beam splitter 215.

The beam splitter 215 transmits almost 100% of P-polarized light and reflects almost 100% of S-polarized light. When the phase difference resulting from the liquid-crystal device is N wavelengths (N is an integer) (namely, during the write mode), almost 100% of the incident light beam is transmitted through the beam splitter 215.

The optical monitor 216 detects the S-polarized light beam reflected from the beam splitter 215, and outputs a detected signal to the servo controller 109 through the preamplifier 120.

The servo controller 109 detects the presence or absence of the S-polarized light beam in response to the detected signal from the optical monitor 216, thereby monitoring the operation of the wavelength-type liquid-crystal device 214, namely, a change in the optical coupling efficiency, as will be discussed later.

When the phase difference resulting from the wavelength-type liquid-crystal device 214 is half-wave shifted from the N wavelengths (namely during the read mode), the polarization direction is rotated by 45 degrees. Around 50% of the light beam is transmitted through the beam splitter 215 while the remaining 50% of the light beam is reflected from the beam splitter 215.

The light beam transmitted through the beam splitter 215 is incident on the beam splitter 218. The beam splitter 218 splits the incident beam into a light beam to be guided to the FAPC detector device 219, which monitors the amount of light traveling to the signal recording surface of the optical disk 102, and a light beam which actually travels to the signal recording surface through the object lens 220.

The light beam emitted from the semiconductor laser device 212 and then split by the beam splitter 218 is incident on the object lens 220.

The object lens 220 focuses the incident light beam at one point on the signal recording surface of the optical disk 102. The object lens 220 is moved in a focus direction represented by an arrow F and in a tracking direction represented by an arrow T in FIG. 10.

A light beam reflected from the signal recording surface is again incident on the beam splitter 218 after being transmitted through the object lens 220. The beam splitter 218 reflects and splits the incident beam according to the reflectance thereof.

The reflected light beam split by the beam splitter 218 is converged by the collimator lens 213. The multi-lens 222 imparts astigmatism to the light beam to obtain a focus error signal using an astigmatism method. The light beam is then received by the optical detector 223, and becomes a focus error signal, tracking error signal, and RF signal, based on the resulting light spot.

The switching operation between the recording and playback is discussed below.

During the recording mode, the servo controller 109 supplies the wavelength-type liquid-crystal device 214 with a voltage at an appropriate level so that the wavelength-type liquid-crystal device 214 generates a phase difference of a half-wave plate. The variable optical coupling efficiency device 3 is thus set for a transmission ratio of 50%.

A laser output power of 5 mW results, thereby reducing laser noise and providing excellent playback characteristics.

To switch from the read mode to the write mode, the servo controller 109 modifies the voltage applied to the wavelength-type liquid-crystal device 214 in response to a command from the system controller 107. The phase difference resulting from the wavelength-type liquid-crystal device 214 is thus changed.

In response to a response from the wavelength-type liquid-crystal device 214, the variable optical coupling efficiency device 3 changes the transmission ratio thereof from 50% to 100%, thereby changing the laser output power from 5 mW to 2.5 mW.

Subsequent to the start of the response from the wavelength-type liquid-crystal device 214, the laser controller 121 switches the mode from read to write at an appropriate timing in response to a command from the system controller 107.

To switch from the write mode to the read mode, the laser controller 121 switches the mode from write to read in response to a command from the system controller 107. The laser output power is as low as 2.5 mW and the laser noise is increased.

Subsequent to the switching to the read power, the servo controller 109 modifies the voltage applied to the wavelength-type liquid-crystal device 214 in response to a command from the system controller 107, thereby causing a phase difference in the wavelength-type liquid-crystal device 214 to change.

In response to a response from the wavelength-type liquid-crystal device 214, the variable optical coupling efficiency device 3 changes the transmission ratio thereof from 100% to 50%. In this way, the laser output power changes from 2.5 mW to 5 mW. The laser noise is reduced, and an excellent replay signal is thus detected.

However, if the switching of the mode is not carried in the procedure described above, the following disadvantage occurs.

In the switching from the read mode to the write mode, a recording operation is initiated with a high optical power (with a low optical coupling efficiency), and the apparatus attempts to result in an output power above the maximum laser output power. The laser itself could be damaged.

In the switching from the write mode to the read mode, a replay operation is initiated with a low optical power (with a high optical coupling efficiency). The noise level becomes high, thereby degrading playback characteristics.

If the switching process between the write mode and the read mode is performed in the procedure described above, the object of the present invention is achieved. Specifically, an optical head and a recording and playback apparatus employing the optical head are thus provided in which the laser noise during the playback mode is reduced sufficiently, even if the output power ratio of write power/read power is low, and excellent recording and playback characteristics are achieved even if a light source easy to manufacture or having a low optical output power rating is used.

In the first embodiment as shown in FIGS. 11A-11C, after a response time that elapses between the beginning of the direction change of the liquid-crystal molecules of the liquid-crystal device 214 and the end of the direction change of the liquid-crystal molecules (namely, pre-recording time in preparation for a recording operation), the driving current of the semiconductor laser device 212 is switched to the recording one to switch from the playback mode to the recording mode. This is intended to avoid a damage to the semiconductor laser device 212.

To switch from the recording mode to the playback mode, the driving current of the semiconductor laser device 212 is switched to the playback one, and then after a response time that elapses between the beginning of the direction change of the liquid-crystal molecules of the liquid-crystal device 214 and the end of the direction change of the liquid-crystal molecules (namely, preplayback time in preparation for a playback operation), the playback operation is performed. This arrangement controls the effect of laser noise contained in the playback signal when the power of the semiconductor laser device 212 drops during the response time.

The pre-recording period and the preplayback period are standby periods during which neither recording nor playback is carried out. Shortening the standby time is important to perform fast recording and playback operations.

An optical head, a recording and playback apparatus, and a variable optical coupling efficiency device for performing a fast recording operation and a fast playback operation in accordance with a second embodiment are discussed below.

The second embodiment of the present invention is discussed with reference to the construction shown in FIG. 10 again.

Figure 12:
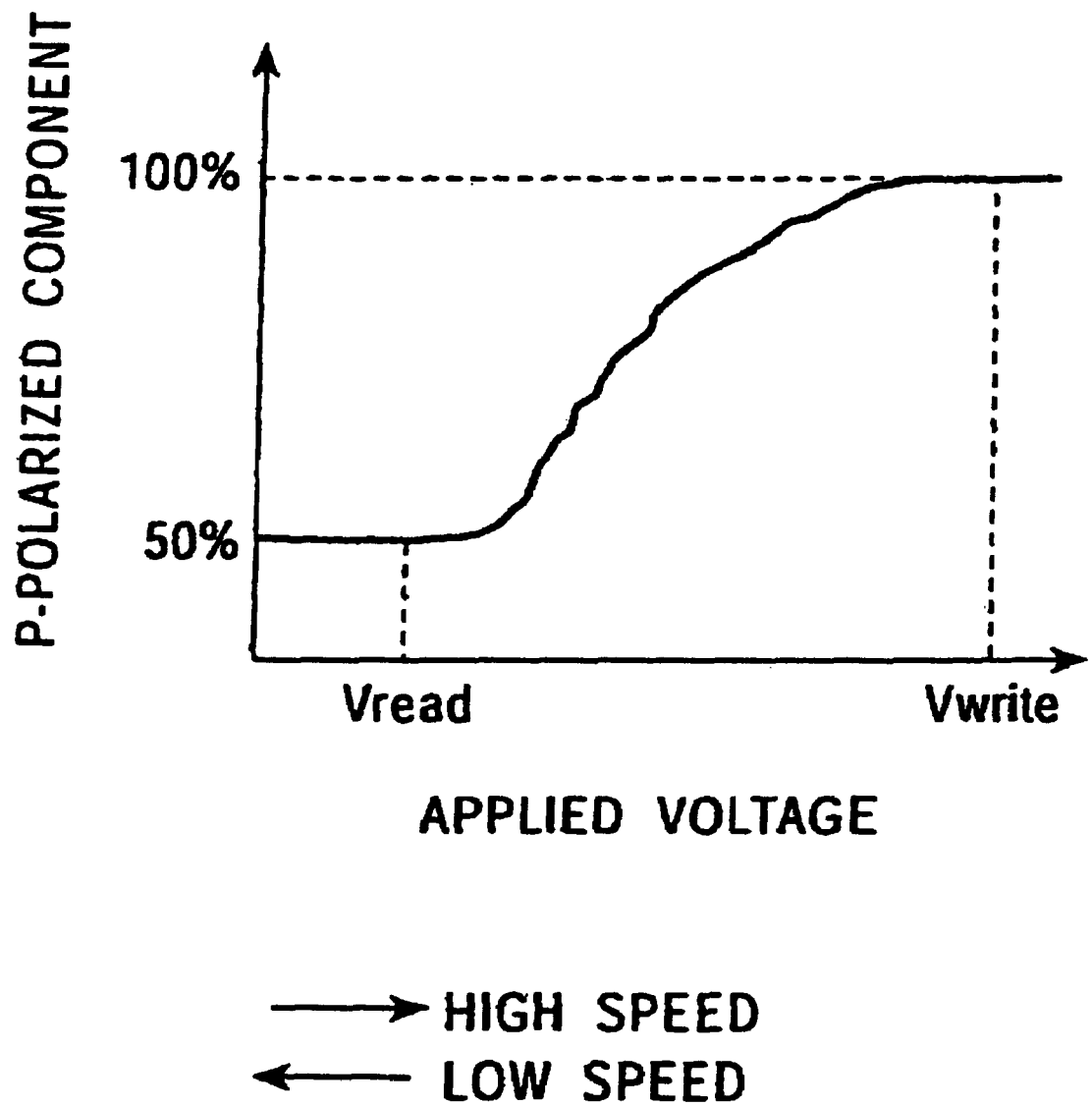
FIG. 12 illustrates a change in transmittance ratio of a wavelength-plate type liquid-crystal device with respect to a response as a variable optical coupling efficiency device in accordance with a second embodiment of the present invention.

FIG. 12 is a plot of a change in the transmission ratio of the variable optical coupling efficiency device 3 in response to a response from the wavelength-type liquid-crystal device 214 in accordance with the second embodiment.

The abscissa represents the voltage applied to the wavelength-type liquid-crystal device 214, while the ordinate represents the transmission ratio of the P-polarized light component. Vread represents the voltage applied during the read mode, and Vwrite represents the voltage applied during the write mode (the relationship of Vwrite>Vread holds).

Generally speaking, a response time when the applied voltage is changed from low to high and a response time when the applied voltage is changed from high to low are typically different in the liquid-crystal device.

Figure 13A:
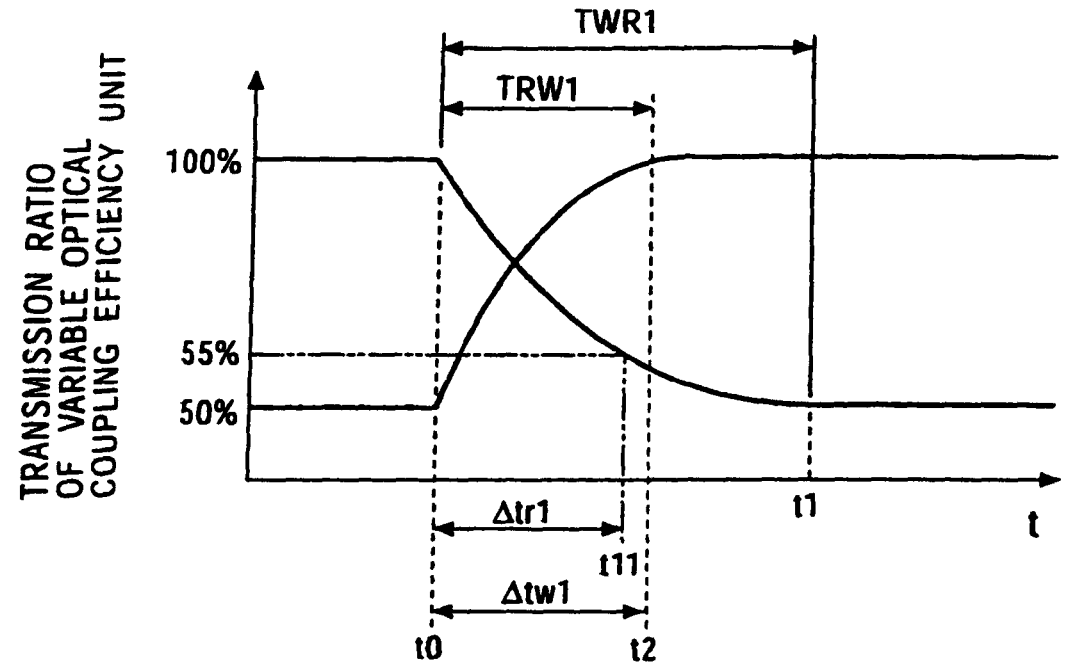
FIGS. 13A and 13B illustrate a change in transmittance ratio of a wavelength-plate type liquid-crystal device with respect to time as a variable optical coupling efficiency device in accordance with a second embodiment of the present invention.
Figure 13B:
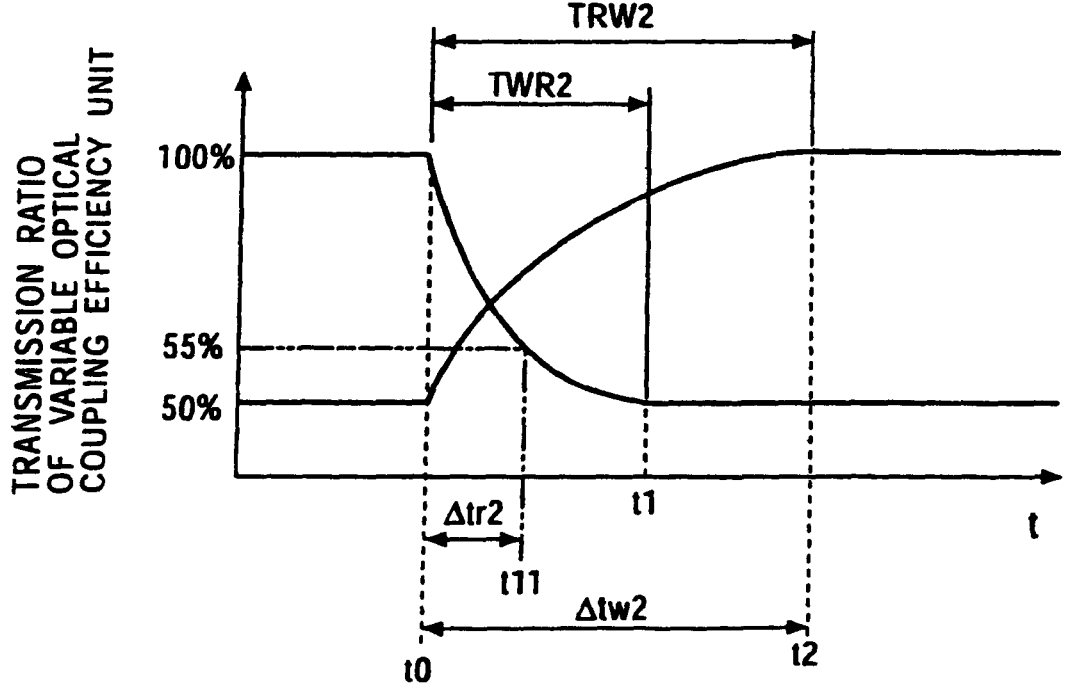

FIGS. 13A and 13B are plots of the transmission ratio of the variable optical coupling efficiency device 3 versus time in response to a response from the wavelength-type liquid-crystal device 214 in accordance with the second embodiment. The abscissa represents time, while the ordinate represents the transmission ratio of light through the variable optical coupling efficiency device 3 (hereinafter referred to as the transmission ratio of the variable optical coupling efficiency device 3).

Symbols shown have the following meanings.

TWR1 and TWR2: first response time the variable optical coupling efficiency device 3 requires to transition from 100% to 50% in transmission ratio TRW1 and TRW2: second response time the variable optical coupling efficiency device 3 requires to transition from 50% to 100% in transmission ratio t0: timing at which the voltage applied to the wavelength-type liquid-crystal device 214 starts changing t1: timing at which the variable optical coupling efficiency device 3 reaches 50% in transmission ratio t2: timing at which the variable optical coupling efficiency device 3 reaches 100% in transmission ratio A transmission ratio of 50% of the variable optical coupling efficiency device 3 corresponds to CER, and a transmission ratio of 100% of the variable optical coupling efficiency device 3 corresponds to CWR.

FIG. 13A shows a first case in which the relationship of the first response time TWR1> the second response time TRW1 holds.

To switch from the read mode to the write mode, the recording operation must start at timing t2 or later subsequent to the transition of the transmission ratio of the variable optical coupling efficiency device 3 to 100%. This is indented to prevent damage to the semiconductor laser device 212. This remains unchanged from the first embodiment. The standby time $\Delta tw1$ required to switch from the read mode to the write mode=t2-t0=TRW1, and is equal to the second standby time TRW1.

When the mode is switched from the write mode to the read, the read mode preferably starts at timing t2 or later subsequent to the transition of the transmission ratio of the variable optical coupling efficiency device 3 to 50% to prevent noise. This is intended to control laser noise. Taking into consideration noise level that is permissible in the whole system because of the effect of the ECC process, the playback signal is still free from the noise even if the read mode starts at timing t11 (t11>t1) when the transmission ratio is higher than 50% (55% in this case). The standby time required to switch from the write mode to the read mode $\Delta tr1 = t11-t0 \leq TWR1$. The standby time is set to be shorter than the first response time TWR1 by switching to the read mode at a transmission value larger than 50%.

FIG. 13B shows a second case in which the relationship of the first response time TWR2> the second response time TRW2 holds.

The standby time to switch from the read mode to the write mode $\Delta tw2 = t2-t0 = TRW2$, thus equals the second standby time TRW2.

When the mode is switched from the write mode to the read mode, taking into consideration noise level that is permissible in the whole system, the playback signal is still free from the noise even if the read mode starts at timing t11 (t11>t1) when the transmission ratio is higher than 50% (55% in this case) as in the first case. In the second case as well, the standby time required to switch from the write mode to the read mode $\Delta tr2 = t11-t0 \leq TWR2$. The standby time is set to be shorter than the first response time TWR2 by switching to the read mode at a transmission value larger than 50%.

The sum of the first response time and the second response time may be substantially constant. If one is set to be shorter, the other response time gets longer. As discussed in connection with the first and second cases, the second response time TRW set to be shorter than the first response time TWR is advantageous to shorten the sum of the standby times.

If the sum T1 of the standby times in the first case $=\Delta tr1+\Delta tw1$, and the sum T2 of the standby times in the second case=$\Delta tr2+\Delta tw2$, $T1 \leq T2$.

(1) The standby time $\Delta tw$ required to switch from the read mode to the write mode cannot be set to be shorter than the second response time TRW. (2) The standby time $\Delta tr$ required to switch from the write mode to the read mode can be set to be shorter than the first response time TWR.

From (1) and (2), the use of the liquid-crystal device with the second response time TRW$\leq$ the first response time TWR is advantageous to shorten the sum of the standby times $\Delta tw$ and $\Delta tr$.

Let TWR represent the first response time required for the transition of the optical coupling efficiency of the variable optical coupling efficiency device 3 from CEW to CER, and let TRW represent the second response time required for the transition of the optical coupling efficiency of the variable optical coupling efficiency device 3 from CER to CEW. The variable optical coupling efficiency device 3 satisfying the condition of TWR$\leq$TRW is advantageous to shorten the sum of the standby times $\Delta tw$ and $\Delta tr$.

The light beam emitted from the semiconductor laser device 212 is controlled as below. During the write mode, the optical output power of the light beam of the semiconductor laser device 212 is changed to the write output power PW. During the read mode, the optical output power of the light beam emitted from the semiconductor laser device 212 is changed to the read output power PR. The switching operation from the write output power PW to the read output power PR is carried out within the first response time TWR, and the switching operation from the read output power RR to the write output power PW is carried out subsequent to the elapse of the second response time TRW.

In accordance with the second embodiment, the standby pre-recording time in preparation for recording and the standby preplayback time in preparation for playback are shortened. The recording operation and the playback operation are carried out fast.

In accordance with the second embodiment, the liquid-crystal device is included as the variable optical coupling efficiency device 3. The present invention is not limited to the liquid-crystal device. A variety of the variable optical coupling efficiency device 3 may be used as discussed in connection with the first embodiment.

What is claimed is:

1. A recording and playback apparatus comprising:
    a rotary drive configured to support and rotate an optical recording medium;
    an optical head configured to direct a light beam to the optical recording medium rotated by the rotary driver through a light condenser and to detect light reflected from the optical recording medium through the light condenser using with a light detector; and
    an actuator configured to move the optical head,
    wherein the optical head includes,
        a light source configured to emit the light beam,
        the light condenser configured to feed the light beam emitted from the light source to the optical recording medium,
        a light splitter configured to split light into the light beam emitted from the light source and the light beam reflected from the optical recording medium,
        the light detector configured to detect the light beam reflected from the optical recording medium and split by the light splitter,
        a variable optical coupling efficiency device which is disposed between the light source and the light splitter and is configured to vary the optical coupling efficiency thereof, which is a ratio of the amount of light condensed on the optical recording medium to the total amount of light of the light beam emitted from the light source,
    a control device configured to control the switching of optical coupling efficiency of the variable optical coupling efficiency device in response to switching between a write mode and a read mode to the optical recording medium,
    wherein the control device is configured to control the switching of the optical coupling efficiency so that the relationship of CEW>CER holds where CEW represents the optical coupling efficiency during the write mode and CER represents the optical coupling efficiency during the read mode,
    wherein the control device is configured to vary the optical coupling efficiency of the variable optical coupling efficiency device prior to the change of mode if the read mode is switched to the write mode, and the control device is configured to vary the optical efficiency of the variable optical coupling efficiency device subsequent to the change of mode if the write mode is switched to the read mode,
    wherein the control device is configured to control the variable optical coupling efficiency device so that the relationship of $TWR \geq TRW$ holds where TWR represents a first response time which the variable optical coupling efficiency device takes to transition from an optical coupling efficiency of CEW to an optical coupling efficiency of CER and TRW represents a second response time which the variable optical coupling efficiency device takes to transition from an optical coupling efficiency of CER to an optical coupling efficiency of CEW.

2. A recording and playback apparatus according to claim 1, wherein the variable optical coupling efficiency device is an optical path branching device configured to branch a light beam into at least two optical paths, and vary the optical coupling efficiency by changing the branching ratio of the two optical paths.

3. A recording and playback apparatus according to claim 2, wherein the variable optical coupling efficiency device includes a wavelength plate, a rotation unit for rotating the wavelength plate, and a beam splitter layer.

4. A recording and playback apparatus according to claim 2, wherein the variable optical coupling efficiency device includes a liquid-crystal device and a beam splitter layer.

5. A recording and playback apparatus according to claim 2, wherein the variable optical coupling efficiency device includes a liquid-crystal device which has a region where phase difference is variably controlled in a diffraction grating configuration.

6. A recording and playback apparatus according to claim 2, wherein the variable optical coupling efficiency device includes a diffraction grating and a displacement unit for displacing the diffraction grating.

7. A recording and playback apparatus according to claim 1, wherein the variable optical coupling efficiency device varies the optical coupling efficiency thereof by varying one of the transmittance and reflectance thereof to the light beam.

8. A recording and playback apparatus according to claim 7, wherein the variable optical coupling efficiency device includes a filter for lowering the transmittance thereof to the light beam, and a displacement unit for displacing the filter.

9. A recording and playback apparatus according to claim 7, wherein the variable optical coupling efficiency device includes a liquid-crystal device that varies the transmittance thereof to the light beam.

10. A recording and playback apparatus according to claim 9, further comprising a light beam control device configured to switch the output power of the light beam emitted from the light source to write power PW during the write mode and switch the output power of the light beam emitted from the light source to read power PR lower in level than the write power PW during the read mode,
    wherein the light beam control device is configured to switch the output power of the light beam from the write power PW to the read power PR within the first response time TWR, and switch the output power of the light beam from the read power PR to the write power PW at the moment the second response time TRW elapses.

* * * * *